United States Patent
Billman

(10) Patent No.: US 8,102,265 B1
(45) Date of Patent: Jan. 24, 2012

(54) SYSTEMS AND METHODS FOR PERSONAL RADIO FREQUENCY IDENTIFICATION TAG CREATION AND ITEM INVENTORYING

(75) Inventor: Bradly Jay Billman, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 657 days.

(21) Appl. No.: 12/235,023

(22) Filed: Sep. 22, 2008

(51) Int. Cl.
G08B 13/14 (2006.01)

(52) U.S. Cl. .................. 340/572.4; 340/5.92; 705/28

(58) Field of Classification Search .... 340/572.1–572.9, 340/10.1–10.6, 5.92; 235/385; 705/22, 28
See application file for complete search history.

(56) References Cited

U.S. PATENT DOCUMENTS

| | | | | |
|---|---|---|---|---|
| 5,539,394 | A | * | 7/1996 | Cato et al. ............... 340/5.92 |
| 5,565,858 | A | * | 10/1996 | Guthrie .................. 340/5.92 |
| 5,930,770 | A | * | 7/1999 | Edgar .................... 705/28 |
| 6,032,127 | A | * | 2/2000 | Schkolnick et al. ............. 705/22 |
| 6,993,432 | B2 | | 1/2006 | Jenkins et al. |
| 7,138,915 | B2 | | 11/2006 | Morito et al. |
| 2003/0151028 | A1 | | 8/2003 | Lawrence et al. |
| 2005/0140495 | A1 | * | 6/2005 | Yamazaki et al. ......... 340/572.8 |
| 2005/0145721 | A1 | | 7/2005 | McLaws et al. |
| 2005/0212675 | A1 | * | 9/2005 | Green ................... 340/5.92 |
| 2005/0258961 | A1 | | 11/2005 | Kimball et al. |
| 2007/0285241 | A1 | | 12/2007 | Griebenow et al. |
| 2008/0041947 | A1 | | 2/2008 | Hollister et al. |
| 2008/0084334 | A1 | | 4/2008 | Ballew |
| 2008/0252483 | A1 | | 10/2008 | Hodges |

OTHER PUBLICATIONS

Wang, F. et al. "Temporal Management of RFID Data". Proceedings of the 31st VLDB Conference, Trondheim, Norway, 2005, pp. 1-12.

* cited by examiner

Primary Examiner — Thomas Mullen
(74) Attorney, Agent, or Firm — Brooks, Cameron & Huebsch, PLLC

(57) ABSTRACT

A system for inventorying an item may comprise at least one subsystem that creates a mark on the item with a substance that comprises RFID tags, at least one subsystem that reads a plurality of the RFID tags on the mark, at least one subsystem that determines how many RFID tags were read on the mark, at least one subsystem that assigns an identifier for the item, and at least one subsystem that associates the identifier with how many RFID tags were read on the mark.

18 Claims, 8 Drawing Sheets

SYSTEMS AND METHODS FOR PERSONAL RADIO FREQUENCY IDENTIFICATION TAG CREATION AND ITEM INVENTORYING

CROSS REFERENCE TO RELATED APPLICATIONS

The patent applications below (including the present patent application) are filed concurrently and share a common title and disclosure, each of which is hereby incorporated herein by reference in its entirety:

U.S. patent application Ser. No. 12/234,966, filed on Sep. 22, 2008; and

U.S. patent application Ser. No. 12/235,012, filed on Sep. 22, 2008.

BACKGROUND

A move can be a lengthy, time consuming and arduous task. Often items are stored in boxes and later need to be retrieved, but it may be difficult to find a particular item even if the boxes are labeled. The label may often be obscured by other boxes or incomplete. Also, when using professional movers, the inventorying system is often inaccurate and involves placing stickers on every single household item which may be inconvenient to remove and cannot be re-used for a subsequent move.

In this regard, there is a need for systems and methods for wireless object tracking that overcomes shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for personal RFID tag creation and item inventory provided. For several embodiments, a system for inventorying an item may comprise at least one subsystem that creates a mark on the item with a substance that comprises RFID tags, at least one subsystem that reads a plurality of the RFID tags on the mark, at least one subsystem that determines how many RFID tags were read on the mark, at least one subsystem that assigns an identifier for the item, and at least one subsystem that associates the identifier with how many RFID tags were read on the mark.

Other advantages and features of the invention are described below.

BRIEF DESCRIPTION OF THE DRAWINGS

Personal RFID tag creation and item inventorying is further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
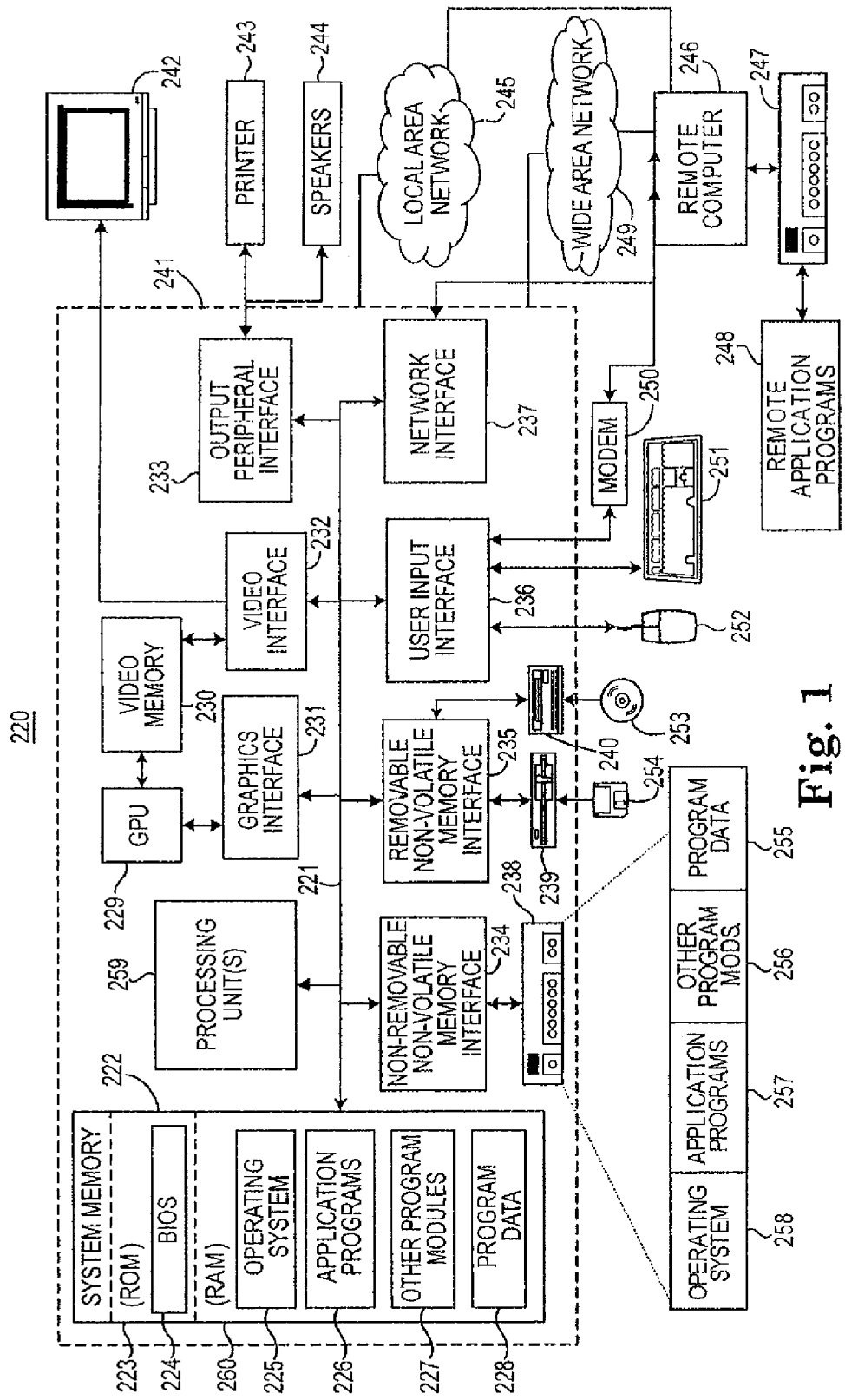
FIG. 1 is a block diagram representing an exemplary computing device suitable for use in conjunction with implementing personal RFID tag creation and item inventorying.

Referring next to FIG. 1, shown is a block diagram representing an exemplary computing device suitable for use in conjunction with implementing the processes described below. For example, the computer executable instructions that carry out many of the processes and methods for personal RFID tag creation and item inventorying may reside and/or be executed in such a computing environment as shown in FIG. 1. The computing system environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary operating environment 220. For example a computer game console may also include those items such as those described below for use in conjunction with implementing the processes described below.

Aspects of the embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during startup, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be performed across a plurality of devices. Such devices might include personal computers, network servers, handheld devices, supercomputers, or computers integrated into other systems such as automobiles and airplanes.

Figure 2:
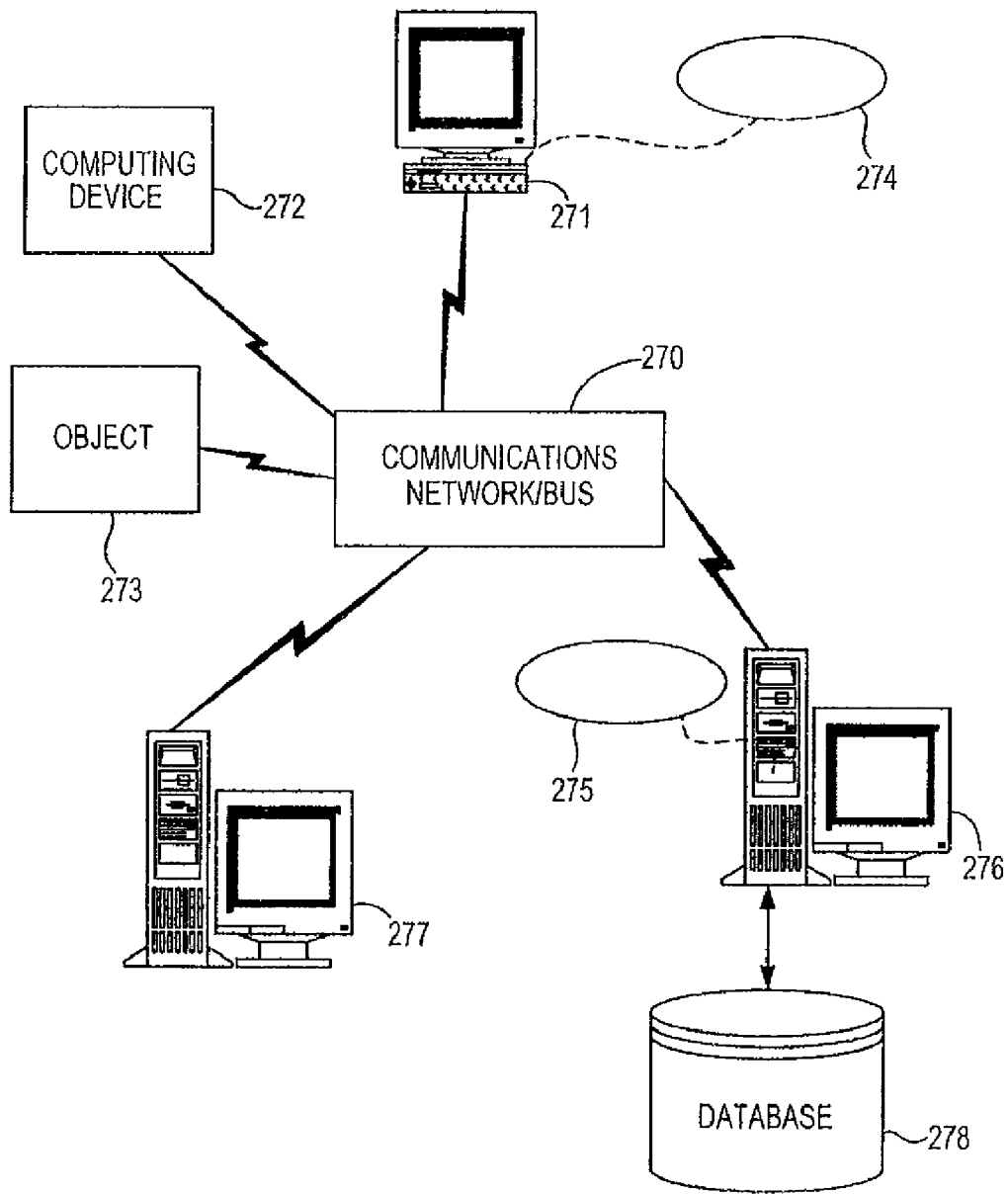
FIG. 2 illustrates an exemplary networked computing environment in which many computerized processes may be implemented to perform personal RFID tag creation and item inventorying.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing personal item inventorying processes for personal RFID tag creation and item inventorying. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
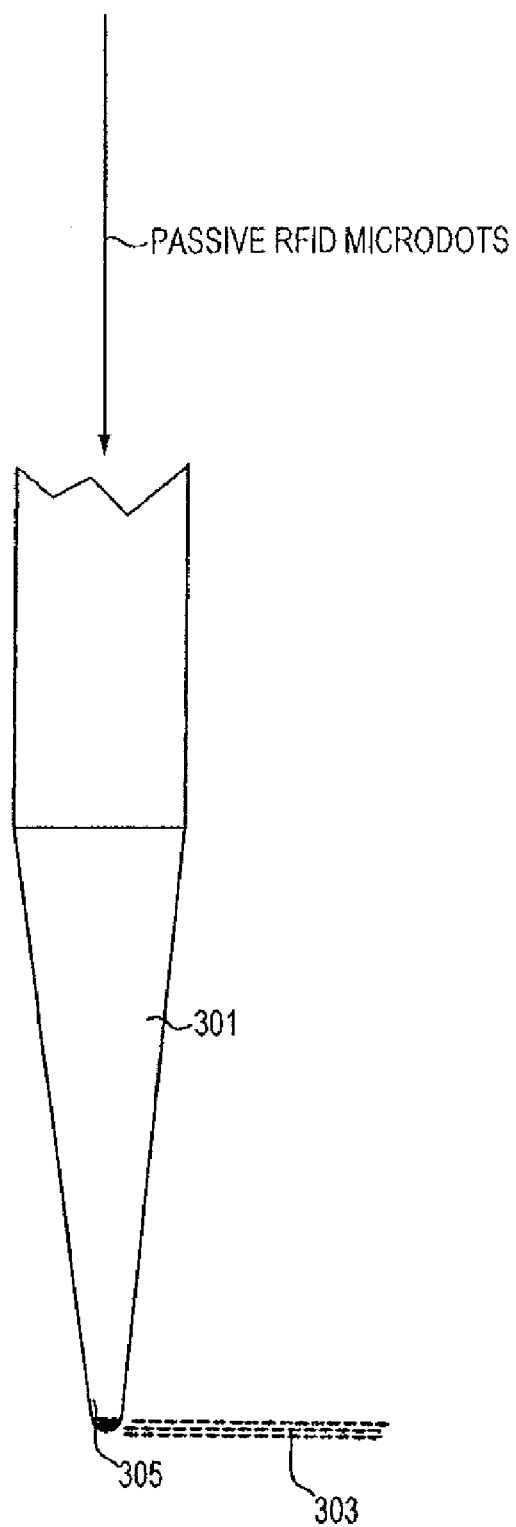
FIG. 3 is a diagram of a side view of an example chipless passive RFID microdot applicator.

Referring next to FIG. 3, shown is a diagram of a side view of an example passive RFID microdot applicator. Traditionally, a microdot was defined as text or an image substantially reduced in size onto a 1 mm disc to prevent detection by unintended recipients. Microdots are normally circular (around one millimeter in diameter) but can be made into different shapes and sizes and made from various materials such as polyester. Currently, radio frequency identification (RFID) technology is such that a passive RFID tag may be made the size of (or fit on) a microdot. Although the electronic chip used in most RFID tags can be smaller than a grain of sand, a tag requires an antenna. The size of an RFID tag is generally constrained by this antenna design. At higher frequencies the antenna is usually designed to be some small fraction of a wavelength, such as quarter-wavelength (roughly 4 inches at 900 MHz and 1 inch at 2.4 GHz). If the antenna is made smaller, then the reading distance of the tag will be reduced. Small antenna coils wound on ferrite (to increase magnetic flux and range) are commonly used for tagging animals; these tags are the size of a grain of rice. Smaller tags can be made by electroforming the antenna directly onto the silicon chip. Also, a chipless passive RFID tag (also known as RF fibers) is one that does not make use of any integrated circuit technology to store information. The tag uses fibers or materials that reflect a portion of the reader's signal back. The unique return signal can be used as an identifier. Therefore, these types of RFID tags may be applied to or be made the size of a microdot (approximately 1 mm in diameter) and are herein described as RFID microdots 303.

The RFID microdot applicator 301 is used to apply multiple RFID microdots to a surface. The applicator 301 is filled with an ink containing a plurality of RFID microdots and distributes the ink containing the microdots in much the same fashion as a ball point pen or other type of pen. However, the size of the opening 305 of the applicator 301 must be large enough to accommodate the passage of the microdots 303 contained in the ink through the opening 305 of the applicator 301 (larger than 1 mm in diameter, for example, if the RFID microdots 303 are 1 mm in diameter). Also, the ink may comprise an adhesive solution such that the microdots adhere to the surface along with the ink. In one embodiment, the contents of the applicator may comprise solely the RFID microdots 303 and adhesive material without other materials.

Figure 4:
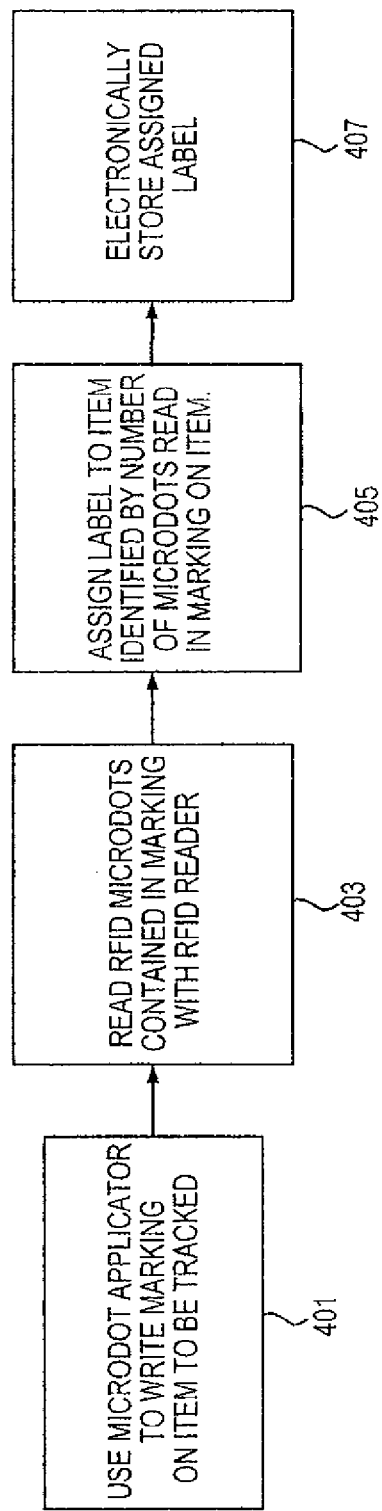
FIG. 4 is a block diagram illustrating an example process according to personal RFID tag creation and item inventorying.

Referring next to FIG. 4 shown is a block diagram illustrating an example process according to personal RFID tag creation and item inventorying. An RFID microdot applicator 301 such as that shown in FIG. 3 may be used to write (401) a marking on an item desired to be tracked. For example, if one is packing personal items in preparation for a household move, then the applicator 301 may be used to mark directly on a personal item such as a book or camera. The resulting mark will contain multiple RFID microdots as dispensed from the applicator that adhere to the item due to the adhesive material included with the microdots. However, it is unlikely that two different markings will contain the exact same number of microdots. A stand-alone RFID reader or one integrated within a mobile computing device may then be used to read (403) the marking on the item (see FIG. 6). For example, one may use an RFID reader integrated with one's cell phone or personal digital assistant (PDA) to read the microdots contained in the marking on the item. The RFID reader will determine the number of RFID microdots read in the mark. Either a user of the device or the RFID reading device itself will then assign (405) a label to the item, associating the label with the particular number of RFID microdots read on the marking applied to the item. If there was already an item marked with the exact same number of microdots, the RFID reader may indicate this to the user and suggest the user extend the mark on the item to increase the number of RFID microdots in order to create a unique number of RFID microdots. The user may enter in a label for the item through an interface on their mobile device having the RFID reader to keep and store (407) on their mobile device an inventory of items marked.

Alternatively, a user may apply an individual RFID tag to each item and manually assign each individual RFID tag a unique identifier and associate that identifier with the item to which the tag was applied.

Figure 5:
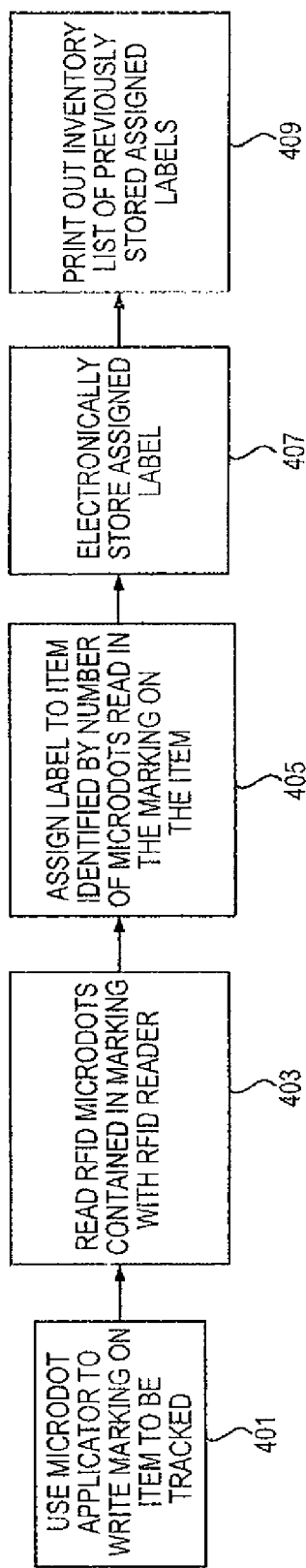
FIG. 5 is a block diagram illustrating an example process according to personal RFID tag creation and item inventorying and inventory list creation.

Referring next to FIG. 5 shown is a block diagram illustrating an example process according to personal RFID tag creation and item inventorying and inventory list creation. After a user has entered in and stored (407) labels for a number of items read (403) by their mobile device having the RFID reader, the user may print out (409) an inventory list of those items or a select subset of those items. This may be via a printing device integrated with the mobile device equipped with the RFID reader or through a stand-alone printer to which the mobile device may be connected. For example, once a user has finished marking (401) and scanning (403) and assigning (405) a label to items to be packed in a box for shipment or storage, the user may print out an inventory list of those items. The list may, for example, be placed in or on the box containing the items. The list may also be printed out on an adhesive label to be placed on the exterior of the box to indicate the contents.

Figure 6:
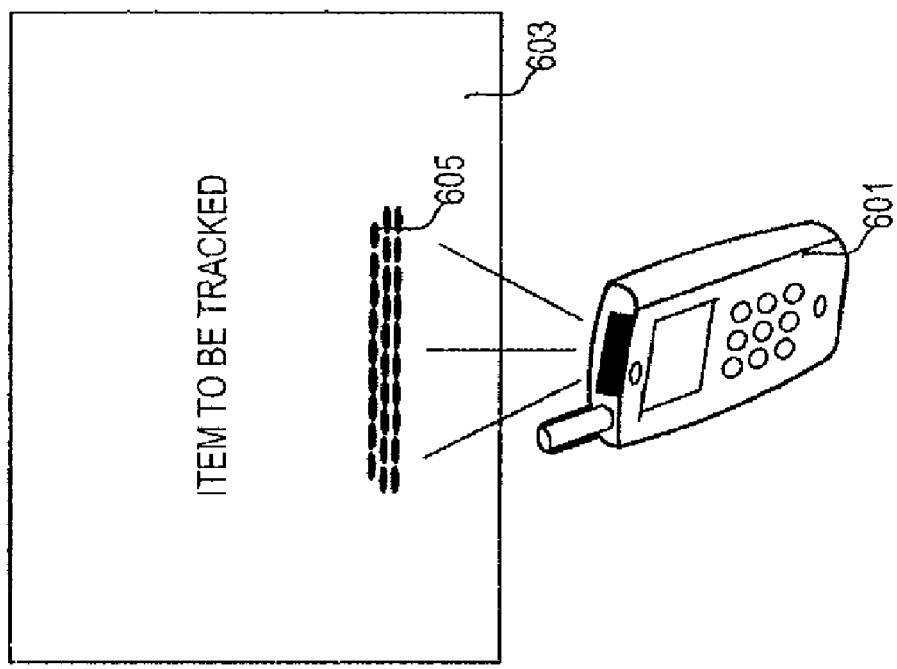
FIG. 6 is a diagram of a side perspective view of an example RFID reader reading an example RFID tag created according to personal RFID tag creation and item inventorying.

Referring next to FIG. 6, shown is a diagram of a side perspective view of an example RFID reader reading an example RFID tag created according to personal RFID tag creation and item inventorying. Shown is the RFID reader 601 reading an RFID microdot marking 605 on an item to be tracked 603. In the example of FIG. 6 the RFID reader 601 is that which is integrated with a mobile computing device.

Figure 7:
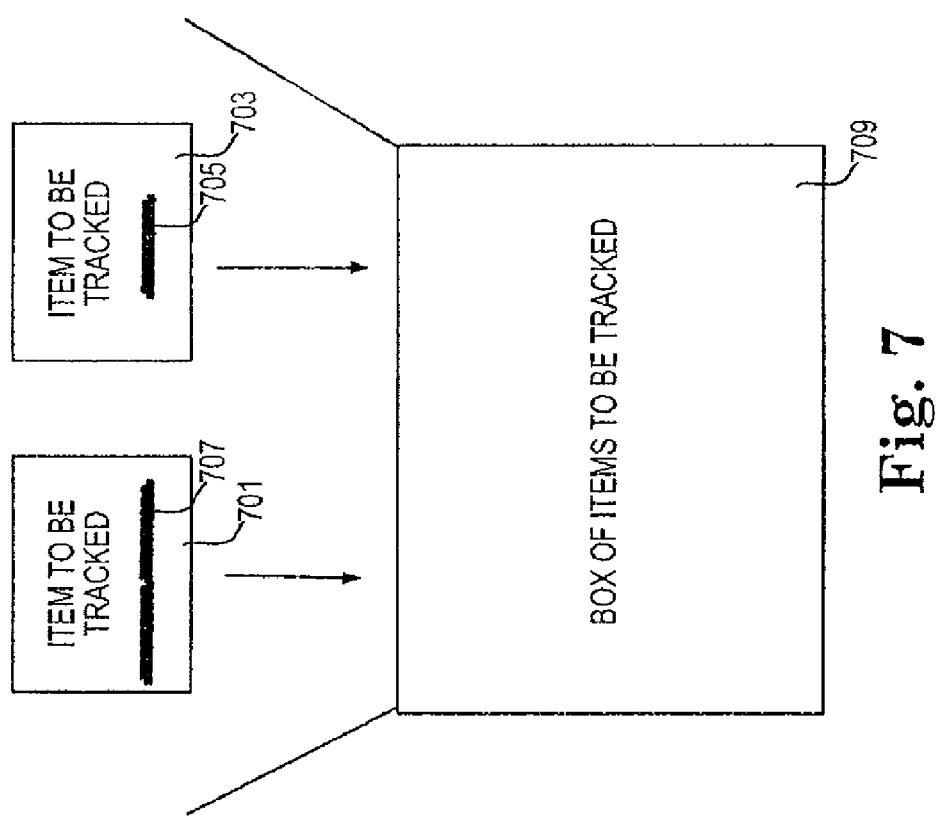
FIG. 7 is a diagram of example items having RFID tags created according to personal RFID tag creation and item inventorying being placed into a box for storage.

Referring next to FIG. 7, shown is a diagram of example items having RFID tags created according to personal RFID tag creation and item inventorying being placed into a box 709 for storage. Shown are two example items 701, 703 to be tracked. Both items have RFID microdot markings 707, 705 having been applied according the processes described above, for example. The items 701, 703 have labels electronically stored associated with the particular number of RFID microdots on each marking 707, 705. Each of the markings 707, 705 have a different number of RFID microdots and thus are individually identifiable and distinguishable from each other when read using a compatible RFID reader 601 (not shown).

Figure 8:
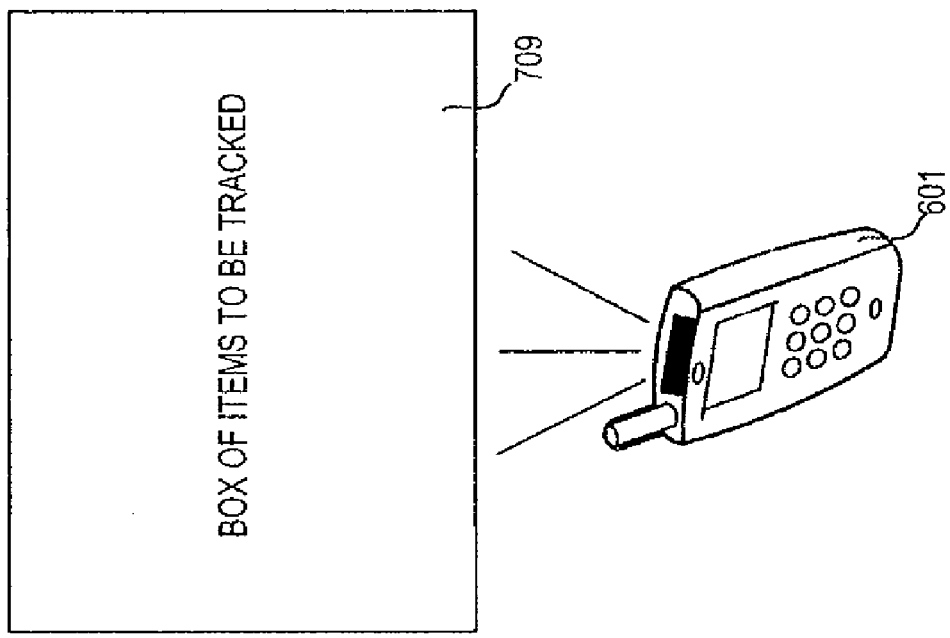
FIG. 8 is a diagram of an example RFID reader reading RFID tags of items having been marked with RFID tags created according to personal RFID tag creation and item inventorying.

Referring next to FIG. 8, shown is a diagram of an example RFID reader 601 reading RFID tags of items in a box 709 having been marked with RFID tags created according to personal RFID tag creation and item inventorying. The RFID reader 601 individually reads each mark of each marked item within the box 709 when in close proximity to the box. The box is made of material through which the radio waves of the reader may penetrate (such as cardboard, for example). The RFID reader is able to distinguish the mark of one item relative to a mark of another item within the box because of the close proximity of all the RFID microdots on one particular item's mark. The RFID reader may then display or print an inventory of the previously scanned items in the box according to the label assigned to each RFID microdot marking on each item.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A device for identifying stored items, the device comprising:
   a memory; and
   a processor coupled to the memory, wherein the processor is configured to cause a system to:
   create individual marks on items with a substance that comprises RFID tags;
   store an inventory list of the items based upon identification of the items using the RFID tags;
   place the items in a storage container;
   determine which items are in the storage container by reading RFID tags on the individual marks while the items are in the storage container and cross referencing data read with the stored inventory list; and
   identify the items by reading how many RFID tags are in each individual mark.

2. The device of claim 1 wherein the RFID tags are read using an RFID tag reader integrated with a mobile computing device.

3. The device of claim 1 wherein the items identified comprise items in a personal household goods move.

4. The device of claim 1 wherein the processor is further configured to cause the system to print the stored inventory list of items.

5. The device of claim 4 wherein the stored inventory list is printed using a mobile computing device integrated with an RFID tag reader used to read RFID tags on the marks.

6. The device of claim 4 wherein the processor is further configured to cause the system to place the stored inventory list on the exterior of the storage container.

7. A method for identifying stored items comprising:
   creating individual marks on items with a substance that comprises RFID tags;
   storing an inventory list of the items based upon identification of the items using the RFID tags;
   placing the items in a storage container;
   determining which items are in the storage container by reading RFID tags on the individual marks while the items are in the storage container and cross referencing data read with the stored inventory list; and
   identifying the items by reading how many RFID tags are in each individual mark.

8. The method of claim 7 wherein the reading the RFID tags is accomplished via an RFID tag reader integrated with a mobile computing device.

9. The method of claim 7 wherein the items identified comprise items in a personal household goods move.

10. The method of claim 7 further comprising printing out the stored inventory list of items.

11. The method of claim 10 wherein the stored inventory list is printed out directly from a mobile computing device integrated with an RFID tag reader used to read RFID tags on the marks.

12. The method of claim 10 further comprising placing the stored inventory list on the exterior of the storage container.

13. A non-transitory computer readable medium including computer readable instructions for identifying stored items stored thereon that, when executed by one or more processors cause a system to:
   create individual marks on items with a substance that comprises RFID tags;
   store an inventory list of the items based upon identification of the items using the RFID tags;
   place the items in a storage container;
   determine which items are in the storage container by reading RFID tags on the individual marks while the items are in the storage container and cross referencing the data read with the stored inventory list; and
   identify the items by reading how many RFID tags are in each individual mark.

14. The non-transitory computer readable medium of claim 13 wherein the reading the RFID tags is accomplished via an RFID tag reader integrated with a mobile computing device.

15. The non-transitory computer readable medium of claim 13 wherein the items identified comprise items in a personal household goods move.

16. The non-transitory computer readable medium of claim 13 wherein the computer readable instructions are executed by the one or more processors causing the system to print the stored inventory list of items.

17. The non-transitory computer readable medium of claim 16 wherein the stored inventory list is printed directly from a mobile computing device integrated with an RFID tag reader used to read RFID tags on the marks.

18. The non-transitory computer readable medium of claim 16 wherein the computer readable instructions are executed by the one or more processors causing the system to place the stored inventory list on the exterior of the storage container.

* * * * *